(No Model.)
W. A. CROWDUS.
GALVANIC BATTERY.
No. 485,319. Patented Nov. 1, 1892.
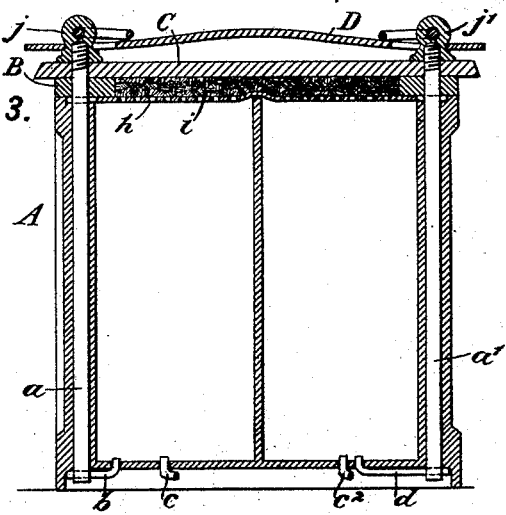
FIG. 3.
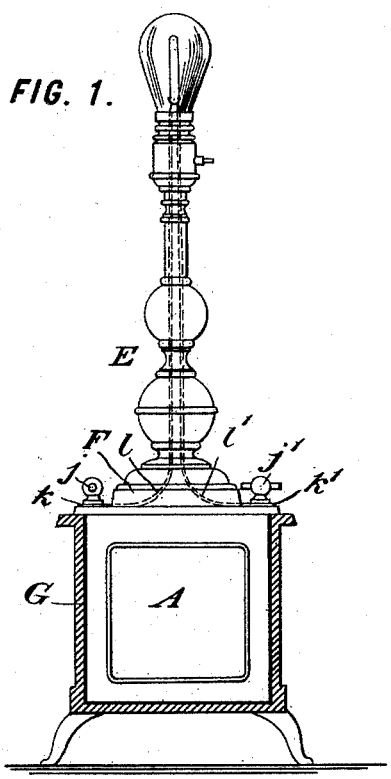
FIG. 1.
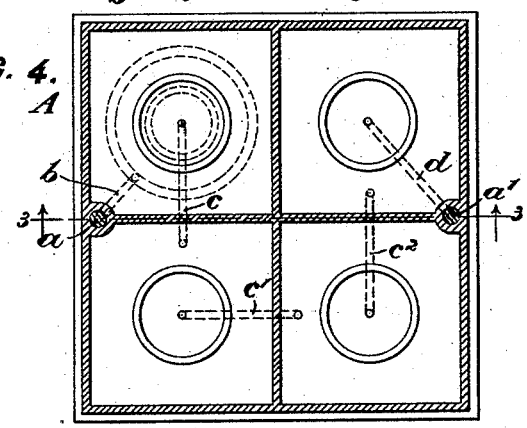
FIG. 4.
FIG. 2.
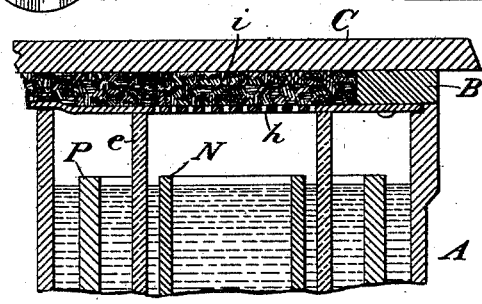
FIG. 5.
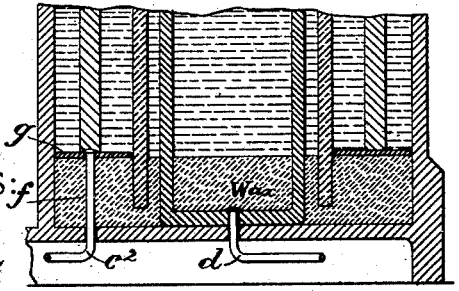
WITNESSES:
Fred White
C. K. Fraser
INVENTOR:
Walter Ambers Crowdus,
By his Attorneys,
Arthur C. Fraser & Co.
THE NORRIS PETERS CO., PHOTO-LITHO., WASHINGTON, D. C.

UNITED STATES PATENT OFFICE.

WALTER AMBUS CROWDUS, OF MEMPHIS, TENNESSEE, ASSIGNOR TO B. M. STRATTON, OF SAME PLACE.

GALVANIC BATTERY.

SPECIFICATION forming part of Letters Patent No. 485,319, dated November 1, 1892.

Application filed December 18, 1891. Serial No. 415,445. (No model.)

*To all whom it may concern:*

Be it known that I, WALTER AMBUS CROWDUS, a citizen of the United States, residing at Memphis, Tennessee, have invented certain new and useful Improvements in Galvanic Batteries for Electric Lighting, &c., of which the following is a specification.

My invention provides certain improvements in galvanic batteries and their connections whereby they are adapted for more convenient use as a means for feeding electric incandescent lamps, electromotors, &c., and whereby, also, their handling and transportation are facilitated.

Figure 1 of the accompanying drawings is a side elevation, partly in vertical section, of an incandescent-electric-lamp stand having a battery in its base and involving my invention. Fig. 2 is an under side view of the lamp-stand removed from the battery-case. Fig. 3 is a vertical cross-section of the battery-cell on the line 3 3 in Fig. 4. Fig. 4 is a horizontal section. In Figs. 3 and 4 the battery-case is shown empty or without the addition of the galvanic elements. Fig. 5 is a fragmentary vertical section through the middle of one of the cells in Fig. 4, showing in detail the construction of the battery.

I have shown in the drawings a battery-case A subdivided by partitions so as to form four cells of battery, as best shown in Fig. 4. The battery case or box may be otherwise subdivided so as to provide a different number of cells. The battery-case may be made of hard rubber, saturated wood, or other suitable material and is formed with a recessed bottom, as shown in Fig. 3, the bottom recess affording room for the electrical connections from cell to cell. At opposite sides two metal rods $a$ $a'$ pass vertically through the battery-case, being embedded in the walls thereof, their upper ends projecting above the case and being screw-threaded, while their lower ends project into the recess at the bottom of the case and constitute binding posts or connections, to which the connecting-wires of the cells are joined. In Fig. 4 the cells are shown coupled in series, in which case from the lower end of rod $a$ a wire $b$ leads to the zinc or positive element in the first cell. Thence a wire $c$ leads from the carbon or negative element thereof to the positive of the second cell. Thence a wire $c'$ leads from the negative thereof to the positive of the third cell, and from this cell a wire $c^2$ leads from the negative to the positive of the fourth cell, and from this one a wire $d$ leads to the rod $a'$. These connections extend from cell to cell in the bottom recess, and they enter each cell and connect with the elements thereof in the manner clearly shown in Fig. 5 or in any other suitable manner by passing through the bottom of the cell.

In Fig. 5, $e$ designates a porous cup dividing the cell, P designates the positive or zinc element, and N the negative or carbon element, which are formed cylindrically and arranged, respectively, outside of and within the porous partition. The bottom of the porous partition, as also the bottom of the carbon cup N, is sealed in a layer of wax $f$. The wire, (herein lettered $d$,) which connects with the carbon cup, passes up through the bottom and joins the bottom of this cup. The wire lettered $c^2$, which makes connection with the positive element, passes up through the bottom and through the layer of wax, and is united to an amalgamated metal plate $g$, on which the bottom of the zinc element rests. The zinc when it needs renewing may be lifted out without the necessity for detaching any connection, and the new zinc on being simply set into the cell and resting on the plate $g$ will make perfect contact therewith and thereby complete the connection. Over the top of the battery is placed a tray B, consisting of an open frame, on the bottom of which is fastened a layer $h$ of flexible rubber, which rests directly upon the upper ends of the porous partitions $e$. This rubber diaphragm is perforated over the negative cell or chamber inclosed within each porous partition, as clearly shown in Fig. 5, in order that the gases or fumes liberated therein may pass through the perforations into the open space within the frame of the tray, which space is filled with metallic salts or other suitable material at $i$, adapted to unite or absorb with and neutralize the fumes. Over the tray is placed a cover C, which has perforations for admitting the upper ends of the rods $a\,a'$, and screw-caps $j\,j'$ are screwed upon the ends of these rods, so that they tightly clamp the cover and hold it firmly in place over the battery-cell.

The battery may be very conveniently carried by providing a handle D, Fig. 3, and inserting the ends of the rods through holes in its ends and then screwing down the caps $j\,j'$. The handle D may be made of a strip of leather or other material.

Fig. 1 shows how my invention is utilized for the construction of an electric-lamp stand fed by a battery. E designates the lamp-standard, on the top of which an incandescent lamp is mounted, and the bottom of which is formed with a base F, having laterally-projecting ears $k\,k'$, the perforated ends of which fit over the ends of the rods $a\,a'$, and are fastened down by screwing down the caps $j\,j'$. The ears $k\,k'$ are insulated from each other and form the base F, and are connected to the respective circuit-wires $l\,l'$, leading up through the standard E to the lamp-socket, these wires being shown in dotted lines in Fig. 1. The construction may be that shown in Fig. 2, where the base F is of wood and the ears $k\,k'$ are of metal plates or bars separately fastened thereto and separately connected to the wires $l\,l'$. By means of the construction described the one operation of placing the lamp-stand on top of the battery and screwing down the caps $j\,j'$ both mechanically connects the lamp-stand to the battery and electrically connects the lamp-circuit with the terminals of the battery.

The base F may be omitted in practice and the ears $k$ and $k'$ be secured by screws to the hard-rubber battery-cover; and the outer ends of the ears $k$ and $k'$ may extend out from under the canopy which forms the base of the lamp-pedestal, thereby mechanically securing the lamp to the battery-cover and electrically connecting the lamp through the cover. This construction renders the use of batteries for feeding isolated electric lamps feasible for domestic and other private use, since all trouble in making connections is avoided and the battery is rendered very easy of access for recharging. The battery-case A sets into an ornamental box-like receptacle G, forming a base of suitable design for a lamp-stand. To remove the battery from this receptacle G, it is lifted by means of the standard E, which thus constitutes a handle, or if the standard be detached it is lifted by the screw-caps $j\,j'$ or by attaching a handle D, as shown in Fig. 3. The battery-cover C is made to overhang the battery and form a ledge resting on the top of the box G, thereby making a close and workmanlike fit therewith, or the bottom of the battery-case A might rest on the bottom of the box G, if preferred.

My invention is also applicable to other structures which are to be fed with an electric current from a battery—such, for example, as an electromotor. In the case of a motor or any other device to be fed from the battery the rods $a\,a'$ and screw-caps $j\,j'$ afford an equally convenient and satisfactory means for effecting simultaneously both the mechanical and electrical connections. Thus an electromotor will be constructed at its base in the same manner as shown in Fig. 2, so that upon placing it over the battery-case and screwing down the caps $j\,j'$ it will be firmly mounted in place, and its electric terminals are connected to the respective terminals $a\,a'$ of the battery.

The constructions shown in Fig. 5 are nearly the same as those claimed in my application for patent, Serial No. 378,873, filed January 24, 1891, the only difference being in the construction of the tray B with the flexible rubber bottom $h$, and in the construction of the cover C. With these exceptions no claim is made to anything shown in Fig. 5 in this application.

The screw-caps $j\,j'$ are essentially nuts, and may be substituted by any other suitable construction of thumb-nuts or nuts to be turned by a wrench.

I claim as my invention the following-defined novel features, substantially as hereinbefore specified, namely:

1. In a galvanic battery, a battery-case provided with metal rods $a\,a'$, extending through it from top to bottom and connected at their bottom ends to the respective electrodes of the battery.

2. In a galvanic battery, a battery-case provided with metal rods $a\,a'$, extending through it from top to bottom and connected at their bottom ends to the respective electrodes of the battery, a cover C for said case, fitting over the upper ends of said rods, and nuts screwing thereon to clamp the cover to the battery-case.

3. The combination, with a galvanic battery comprising a battery-case A, having rods $a\,a'$, and cover C, of a device to be fed with current from said battery, having a base F and fastening-ears $k\,k'$, constituting the opposite terminals of its electric circuit, and nuts $j\,j'$, screwing on the threaded ends of said rods to clamp said ears thereto, whereby said device is simultaneously connected both mechanically and electrically to the battery.

4. An electric-lamp stand consisting of the combination of a base-receptacle G, a galvanic battery comprising a battery-case A, having rods $a\,a'$, and cover C, and a lamp-standard E, the base of which is provided with fastening-ears $k\,k'$, constituting the terminals of the circuit connections to the lamp-socket, and nuts $j\,j'$, screwing on the ends of said rods to clamp said ears thereto, whereby the lamp-standard is fastened removably to the battery simultaneously with the making of its circuit connection therewith and serves as a handle for lifting out the battery from said base.

5. In a galvanic battery, the combination of a battery-case divided into compartments, a cover fitting thereover, and an intervening tray B, formed with a bottom of flexible sheet rubber $h$, resting directly over the cells of the battery-case.

In witness whereof I have hereunto signed my name in the presence of two subscribing witnesses.

WALTER AMBUS CROWDUS.

Witnesses:
PERCY R. LEMMAN,
J. L. HUDGINS.